Aug. 29, 1961 J. PRITCHARD ET AL 2,998,556
SEMI-CONDUCTOR DEVICE
Filed March 4, 1959

INVENTOR
*J. PRITCHARD*
*G. BROOKES*
BY
Frank R. Trifari
AGENT 2,998,556
Patented Aug. 29, 1961

2,998,556

SEMI-CONDUCTOR DEVICE

John Pritchard, East Wellow, Southampton, and Geoffrey Brookes, Bassett, Southampton, England, assignors to North American Philips Company, Inc., New York, N.Y., a corporation of Delaware Filed Mar. 4, 1959, Ser. No. 797,279
Claims priority, application Great Britain Mar. 4, 1958
21 Claims. (Cl. 317—234)

Figure 1:
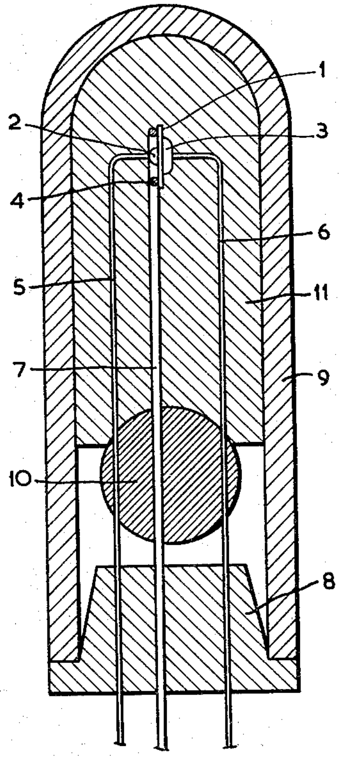

The present invention relates to semi-conductor devices and to methods of manufacturing semi-conductor devices. The term "semi-conductor device" includes any device having a semi-conductor body provided with at least one electrode, for example point-contact devices, junction devices and photo-electric devices. The semi-conductor body may be monocrystalline or polycrystalline.

The problem to which the present invention relates is that of improving the electrical stability of semi-conductor devices. It is found, for example, that if a transistor is encapsulated in a container having a filling of silicone oil or silicone grease, the current amplification factor $\alpha_{cb}$ after manufacture is completed may be maintained substantially constant with time for a period but that after some shelf storage time or normal use the value $\alpha_{cb}$ decreases progressively. This progressive decrease is most marked after a period of heavy loading or use at an increased ambient temperature, for example, at about 80° C., in which case the $\alpha_{cb}$ value may be reduced by about 50% or even more. The factor $\alpha_{cb}$ is defined by the equation:

$$\alpha_{cb}=\left(\frac{\Delta I_c}{\Delta I_b}\right)_{V_{ce}}$$

wherein $\Delta I_c$ and $\Delta I_b$ are small changes in collector current $I_c$ and base current $I_b$ measured at a constant voltage $V_{ce}$ between the emitter and collector. In a similar way, the leakage current of a transistor or of a crystal diode is not stable in time and may generally increase.

According to the present invention, in a semi-conductor device an active part of the surfase of the semi-conductor body is sealed or isolated from the ambient atmosphere by a hermetic seal and boron oxide is provided within the sealed enclosure whereby the electrical stability of the device is improved.

In general, it is advantageous to seal the entire surface of the semi-conductor body from the ambient atmosphere. However, it is sufficient in most cases in order to obtain an improvement in electrical stability to seal an active part of the surface or the active parts of the surface. An active part of the surface is a part which is influenced by its surroundings in that charge carriers may reach the surface of the semi-conductor body at the part. In a transistor, for example, the areas in the vicinity of the collector or emitter, where minority carriers may reach the surface, are active parts. In a Hall-effect device where the charge carriers flow substantially throughout the semi-conductor body, practically the whole surface is considered active and preferably the entire surface will be enclosed within the seal.

The electrical stability is the steadiness of electrical properties with time and in particular the steadiness over a time of heavy electric loading or over time of a high operational temperature. Two important electrical properties of transistors are the current amplification factor $\alpha_{cb}$ and the leakage current. The term "improved" in relation to the electrical stability means improved in comparison with an otherwise identical device in which the boron oxide is omitted.

In general, in addition to stability improvement, the presence of the boron oxide may give improved electrical properties. Thus a transistor according to the present invention may be stabilised with a higher value of current amplification factor $\alpha_{cb}$ and a decreased leakage current.

The physical mechanism underlying the effect obtained with a device according to the present invention is not completely understood. It is, however, suggested, although the present invention is not limited in any way to the correctness of this suggestion, that the hygroscopic boron oxide with its associated water constant provides beneficially humid surface conditions. However, although it could be considered that the function of the boron oxide, which is known to be hygroscopic and may be considered to be at least in part meta-boric acid or boric acid, is merely to provide a suitable water containing medium, it is suggested that in addition the boron oxide itself, in the humid conditions, has a beneficial influence.

In view of the hygroscopic properties of boron oxide, the term "boron oxide" used herein is to be understood in a broad sense and thus to apply to chemical boron oxide with an associated water content so that it is at least in part meta-boric acid or even boric acid.

An improvement in stability is, in general, obtained with any normal degree of associated water content. However, it may be advantageous to adjust the degree of water content of the boron oxide before sealing, and this may particularly be the case in climatic conditions of low or high humidity, since it has been found that an optimum water content applies, since it has been found that an optimum water content applies in respect of certain devices. This optimum content may be dependent not only upon the device but also on its treatment prior to and subsequent to sealing. The water content may be increased, for example, by exposure for a time to a humid atmosphere and may be decreased, for example, by heating for a time, if desired in a controlled atmosphere.

The sealing wall may be of glass which is advantageous in that for all practical purposes glass does not react with the boron oxide. However, as an alternative, a metal wall may be used as long as reaction with the boron oxide does not occur or is not of consequence. If sealing is effected with the use of a glass wall, the glass is required to be raised to a substantial temperature and it is found that immediately after the sealing the electrical properties of the device are, in general, adversely affected. With a comparable device not according to the present invention, the electrical properties, for example, the current amplification factor $\alpha_{cb}$ for a transistor may be adversely affected quite seriously although there is usually subsequent partial recovery. With a similar device according to the present invention, it is found that although the adverse effect will in general occur, the recovery is, in general, more considerable, for instance with devices having an n-p-n structure the values finally attained are usually better than the values obtaining before such heating.

A filler may be provided additionally within the sealed enclosure, for example, silica, sand or lithopone or an organic compound. The organic compound may be an organic polymer or a silico-organic compound, for example, a silico-organic polymer such as that available commercially as bouncing putty. A filler is defined as a substance or mixture which may be used as a carrier, diluent or vehicle for the boron oxide or which is used for a further specific purpose such as to improve heat dissipation from the semi-conductor body to the ambient of the semi-conductor device.

If the boron oxide and the filler are separate, within the hermetic seal, the boron oxide or the filler may be immediately adjacent the semi-conductor body. Preferably the boron oxide and the filler are intimately mixed, in which case the results are in general better than with separate use. The amount of boron oxide is not critical and may be 1% to 10%, for example, may be 4% to 6%, by weight of the amount of the filler.

The boron oxide may be provided wholly or in part in a chemically combined form in an organic compound containing boron and oxygen, which organic compound may be an organic polymer or a silico-organic compound, for example, a silico-organic polymer. Examples of silico-organic polymers are a boric acid derivative of silicone oil and a boron-and-oxygen-containing bouncing putty.

The device may be a semi-conductor diode or have a transistor structure being of p-n-p, n-p-n or of a hook (for example p-n-p-n) structure.

The semi-conductor material of the body may be silicon or germanium.

The present invention also relates to a method of manufacturing a semi-conductor device comprising the step of sealing an active part of the semi-conductor body from the ambient atmosphere by a hermetic seal and providing boron oxide within the seal, whereby the electrical stability of the device is improved. The method according to the present invention provides an easy and reproducible method of manufacturing semi-conductor devices.

The water content within the seal may be adjusted before the sealing, for example, may be reduced by heating or may be increased by exposure to a moist atmosphere.

The entire surface of the body may be sealed from the ambient atmosphere.

Sealing may be provided by a glass wall.

A filler may be provided additionally within the seal, for example, silica, sand or lithopone or an organic compound. The organic compound may be an organic polymer or a silico-organic compound, for example, a silico-organic polymer such as that available commercially as bouncing putty. Another example of a silico-organic compound is a linear di-methyl silicone oil, i.e., a dimethylsiloxane polymer, such as that available from Midland Silicones Limited as MS200/viscosity 100,000 centistokes, the silicone oil may be used alone or be admixed, for example, with lithopone or with silicon sand.

If a filler is used, adjustment of the water content within the seal is preferably effected by adjusting the water content of the filler and boron oxide together immediately before sealing. In this way further water adsorption is prevented.

As an alternative the amount of water within the seal may be adjusted by adjusting the water content of the boron oxide, or as a further alternative adjustment may be effected by adjusting the water content of the additional material. If desired the water content of the boron oxide may be made low and the desired amount of water within the seal may be provided for a substantial part from the additional material.

The boron oxide may be provided in a chemically combined form in an organic compound containing boron and oxygen. The boron-containing compound may be a organic polymer or a silico-organic compound such as a silico-organic polymer. One example of a silico-organic polymer is a boric acid derivative of silicone oil which may be a boron-and-oxygen-containing bouncing putty. Such a boron and oxygen containing organic compound may for example be obtained by heating for a sufficient time a mixture of a silico-organic compound, in particular a silico organic polymer, such as silicone oil and silicone grease, with an amount of boron oxide, until the mixture obtains the typical mechanical properties of a "bouncing putty." So a "bouncing putty" was for example obtained by mixing a linear dimethyl silicone oil, such as commercially available from Midland Silicones Ltd. as MS200/viscosity 100,000 centistokes, with 5% by weight of powdered boric oxide and heating the mixture for 4 hours at 200° C. in air to produce a borated silicone oil. The borated silicone oil may be used alone or may be loaded, for example with lithopone. Such a loaded material is commercially available from Midland Silicones under the name "bouncing putty."

It has been found that the boron-and-oxygen-containing bouncing putty as available commercially from Midland Silicones Limited may be used for a wide range of different and differently-treated devices and for a wide range of water contents and this tends to support the belief mentioned above that the effect is not due solely to the provision of beneficially humid surface conditions and it appears that the presence of the actual radicals of the bouncing putty at the surface of the body assists in providing the stabilizing effect.

If the viscosity of the additional substance or of the organic compound decreases with increase in temperature, the additional substance or organic compound may be used at an increased temperature. This is advantageous in the case in which the substance or compound is provided in an envelope and the semi-conductor body is thrust into the substance or compound, the lower viscosity at elevated temperature facilitating insertion of the body without damage to the body or its attached conductors.

The semi-conductor body may be dipped into boric acid and allowed to dry in air one or more times and thereafter sealed from the ambient atmosphere within a hermetic seal also containing a silico-organic polymer.

The semi-conductor body may be mounted upon a base and the seal provided between the base and a cap member.

If the boron oxide or boron-oxide-containing substance has a relatively high water content, for instance if it has been stored in an ambient atmosphere of high humidity, for example an ambient atmosphere of 50%–60% relative humidity, it is preferred to reduce the water content of the boron oxide or boron-oxide-containing substance, before it is sealed from the ambient atmosphere, for example, by heating, since it has been found that in this way the degree of stability may be enhanced and that the device can withstand higher operating temperatures. The temperature and the time of heating to reduce the water content are not critical. However, it is preferred to perform the heating at a temperature between 70° C. and 150° C. The higher the temperature the shorter the period of heating may be chosen. For some types of transistors a temperature of about 100° C. for a period of about 24 hours is found to be advantageous.

After sealing, the semi-conductor device is preferably subjected to a stabilizing heat treatment. This stabilizing heat treatment is particularly advantageous, if the boron oxide or boron-oxide-containing substance has been heated to reduce its water content. The lower the water content of the boron oxide or boron-oxide-containing substance, the higher may be the temperature of the stabilizing heat treatment. The temperature of the stabilizing heat treatment is preferably chosen to lie between 70° C. and 150° C., since a too low temperature may require a relatively long period of heating and a too high temperature may damage the semi-conductor device. The duration of the stabilizing heat treatment should not be too short and the temperature not too low, since it has been found that in general a certain minimum temperature and/or a minimum of period of time, which may be dependent on the humidity of the boron oxide or boron-oxide-containing substance and may be different for different types of devices, is required for reaching high or optimum values of the electrical properties. The heating temperature is preferably chosen between 100° C. and 150° C. For some types of transistors a temperature of about 140° C. for a period of time of 2–24 hours or even longer is found to give a stable product in that $\alpha_{cb}$ may be stabilized to within 5% or even within 1% for a long life of normal use or storage, the transistor being capable of withstanding high temperatures, such as 100° C. to 140° C.

Embodiments of the present invention will now be described, by way of example, initially generally with reference to the accompanying diagrammatic drawing and thereafter numerical embodiments will be given.

Figure 2:
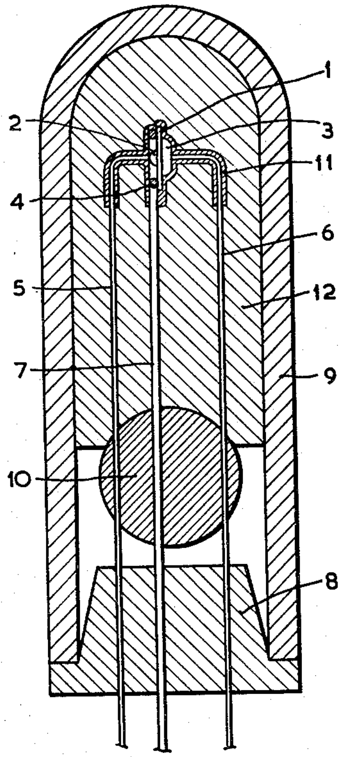

FIGURES 1 and 2 of the drawing each show an example of a device according to the present invention in longitudinal section.

In FIGURE 1 the device is a transistor device comprising a single crystal slice 1 of semi-conductor material having an emitter contact 2, a collector contact 3 and a base contact 4 connected to conductors 5, 6 and 7 respectively. The conductor 7 is comparatively thick and acts also as a mechanical support.

The system 1, 2, 3 and 4 is enclosed in a vacuum-tight envelope comprising a glass base 8 though which the conductors 5, 6 and 7 are sealed, and a domed bulb 9 to which the base 8 is sealed.

Adjacent the base 8, the conductors 5, 6 and 7 are sealed into a glass bead 10.

Boron oxide or a boron-oxide-containing substance is provided within the seal and is indicated generally at 11.

The reference 11 may indicate boron oxide, boron oxide mixed with a filler, for example, silicone vacuum grease, or at least in part boron oxide in chemically combined form, for example, as a boron-and-oxygen-containing bouncing putty. The reference 11 may indicate a homogeneous mass or not. As an example, the boron-oxide or boron-oxide-containing substance may be separated from the system 1, 2, 3 and 4 and be in communication with a filler surrounding the system 1, 2, 3 and 4 by way of a porous wall, for example, of quartz wool or asbestos.

In the transistor of FIGURE 2 corresponding parts to these shown in FIGURE 1 are indicated by the same reference numerals.

In this case, boron oxide or a boron-oxide-containing substance 11 is provided in contact with the system 1, 2, 3 and 4 and the whole is surrounded by a filler 12.

The material indicated by the reference 11 may be provided by dipping the system 1, 2, 3 and 4 mounted on the base 8 into butyl borate and exposing the dipped system to the atmosphere for about ½ hour during which time the borate changes chemically to wet boric oxide approximately to boric acid. The dipping and exposure may be repeated to provide a desired thickness of material 11.

The bulb 9 is about half-filled with a filler 12, for example, silicone vacuum grease, and the bulb 9 placed in position on the base 8. Sealing may be effected by applying heat by radiation from a heated carbon ring to the area of the junction between the bulb 9 and the base 8 and applying a small pressure to urge the bulb 9 and the base 8 together.

In each of the following numerical examples which relate to p-n-p germanium transistors, the semi-conductor device is an alloy-transistor of the same production series, manufactured by alloying an emitter pellet and a collector pellet, both of pure indium, and a base contact consisting of a tin-antimony alloy (95% by weight of Sn and 5% by weight of Sb) to an n-type germanium disc of thickness about 150 microns at 600°C. in an atmosphere of nitrogen and hydrogen for approximately 20 minutes. If not otherwise stated, the p-n-p transistors have been etched electrolytically in a 30% KOH-solution with the collector connected to the positive terminal and using a platinum electrode as the cathode followed by washing with water. With respect to electrical stability, however, the results given hereinafter also hold for transistors chemically etched in an acid, as was proved by similar tests in which the p-n-p transistors were etched in an etching bath consisting of a solution of 48% HF, 67% $HNO_3$ and water in a volume ratio of 1:1:2.

In the following examples which relate to n-p-n germanium transistors, the semi-conductor device is an alloy transistor manufactured by alloying to a semi-conductor disc of p-type germanium of thickness approximately 100 microns an emitter pellet and a collector pellet, which both consist of a lead-antimony alloy (98% by weight of Pb and 2% by weight of Sb) in a neutral atmosphere at a temperature of approximately 600° C. for about 10 minutes and subsequently soldering an annular base contact to the circumference of the semi-conductor disc with the air of indium at a temperature of 500° C. The n-p-n transistors have been etched electrolytically in an etching bath consisting of an aqueous 30% KOH-solution with the emitter and the collector being connected to the positive terminal and using a platinum electrode as the cathode followed by washing with water.

Results obtained will now be given in the form of tables. Each horizontal row relates to a specific device the number of which is given in the first column, and indicates the variation of the quantity concerned, that is to say of the current amplification factor $\alpha_{cb}$ and/or the leakage current $I_{co}$ measured for the device during the sequence of the stages of treatment to which it was subjected in sequence from left to right. The nature of the treatment is indicated in the upper row of the table at the head of each column, the columns headed A, B, C, D and E relating to the following treatments:

The column A shows the value of the quantity concerned after final etching and washing of the device;

The column B shows the value of the quantity concerned after the device has been sealed in a glass envelope;

The column C shows the value of the quantity concerned after the temperature treatment, in general a stabilization treatment, to which the device is subjected at the temperature specified in degrees centigrade for the period of time specified in hours *h* or days *d* as indicated;

The column D, which in most cases is subdivided into a number of sub-columns, gives the value of the quantity concerned during a further treatment, which generally is an endurance test which may consist of a temperature treatment at the temperature specified in degrees centigrade or of a comparatively heavy electrical load of 50 mw. (collector-base voltage 10 v.; emitter current 5 ma.) at a specified ambient temperature given in degrees centigrade. The period of time preceding the measurement of the quantity concerned in the treatment concerned is specified in this column or in the sub-columns in hours *h* or days *d*;

The column E shows the value of the quantity concerned after a subsequent storage period of the device at the specified temperature in degrees centigrade for the specified period expressed in days *d* or hours *h*.

It should also be noted that the values given hereinafter of the quantities $\alpha_{cb}$, $I_{co}$ and noise were measured with the device cooled to room temperature (20° C.). The leakage current $I_{co}$ was always measured with a reverse bias voltage of 15 v. at the collector, and the noise with a reverse bias voltage of 4 v. at the collector while the emitter current was 0.2 ma. If in the following tables a column is omitted or with respect to a certain device the value of the quantity at an instant given in the table is not stated, this means only that the treatment to which this column relates or the measurement to which this instant corresponds was not performed.

EXAMPLE I

Two p-n-p germanium transistors and two n-p-n germanium transistors were each mounted in the manner shown in FIGURE 1. Reference 11 relates to an organic compound containing boron and oxygen, that is to say, a bouncing putty containing boron and oxygen which is commercially available from Midland Silicones Limited, London, under the trade name G4046. Without further treatment, the bouncing putty was introduced into the bulb 9 without preheating from a container arranged in an ambient atmosphere having a relative humidity of about 60%, and subsequently the semi-conductor system of the transistor was carefully thrust into the bouncing putty, after which the envelope was sealed. The transistors were subjected to a temperature treatment and an electric load test which were substantially the same for the n-p-n and p-n-p transistors. The variation of the current amplification factor $\alpha_{cb}$ during the various treatments is given below in Table I, in which the p-n-p transistors are designated 11 and 12 and the n-p-n transistors 13 and 14.

*Table I*

| | A | B | C, 100° C., 200h | D | | | | | E, 20° C., 200h |
|---|---|---|---|---|---|---|---|---|---|
| | | | | 50 mw. | | | 55° C. | | |
| | | | | 200h | 500h | 1,000h | 2,000h | 2,500h | |
| 11 | 174 | 120 | 108 | ------ | 125 | 112 | 116 | 120 | 116 |
| 12 | 178 | 88 | 83 | ------ | 88 | 81 | 87 | 87 | 84 |
| 13 | 46 | 44 | 62 | 62 | 64 | 65 | 63 | -------- | 64 |
| 14 | 63 | 80 | 100 | 103 | 94 | 88 | 75 | -------- | 74 |

As will be seen from the table, the p-n-p transistors reached a substantially stable value of $\alpha_{cb}$ after sealing, while the n-p-n transistors show a satisfactory stability after the stabilization treatment C. Although a stabilizing temperature treatment C accelerates the stabilizing, it is not necessary, at least not with the comparatively high humidity of the boron-oxide-containing substance. The leakage current $I_{co}$ and the noise level of these transistors also had a satisfactory low and stable value. For the p-n-p transistors, $I_{co}$ was from 2 $\mu$a. to 3 $\mu$a., and for the n-p-n transistors from 1 $\mu$a. to 2 $\mu$a., while the noise level of both types of transistors was about 4 db to 5 db. With the given comparatively high humidity of the not-preheated bouncing putty it was found undesirable for these transistors to be heated to temperatures exceeding 100° C. in view of an increase of the leakage current $I_{co}$ during such treatment. Below 100° C., however, the stability was good.

From Table I it will be seen that for the p-n-p transistors (13 and 14) the value of $\alpha_{cb}$ is higher after stabilization than the value $\alpha_{cb}$ after final etching. This latter effect occurs in nearly all cases for n-p-n transistors. A satisfactory stability with a high $\alpha_{cb}$ is obtained with the p-n-p transistors, and with the n-p-n transistors stabilization was provided at an $\alpha_{cb}$ exceeding the final-etching value.

EXAMPLE II

Two p-n-p germanium transistors and two n-p-n germanium transistors were introduced and sealed into a glass envelope in a manner substantially similarly to that described in Example I, with the difference that after the bouncing putty had been introduced into the bulb and before the envelope was sealed, the putty was preheated in air at 100° C. for 24 hours so that its humidity was reduced. In the following Table II, the variation of $\alpha_{cb}$ of the p-n-p transistors designated 21 and 22 and of the n-p-n transistors designated 23 and 24 is shown as measured after the various treatments.

*Table II*

| | A | B | C, 140° C., 3d | D | | | | |
|---|---|---|---|---|---|---|---|---|
| | | | | 50 mw. | | | 55° C. | |
| | | | | 200h | 500h | 1,000h | 2,000h | 2,500h |
| 21 | 276 | 36 | 170 | ------ | 186 | 174 | 174 | 173 |
| 22 | 148 | 29 | 100 | ------ | 97 | 88 | 92 | 92 |
| 23 | 51 | 16 | 72 | 74 | 78 | 78 | 75 | -------- |
| 24 | 71 | 26 | 55 | 49 | 53 | 53 | 58 | -------- |

As will be seen from Table II, the stability of these transistors is satisfactory after the stabilizing temperature treatment C. The noise and leakage current measurements also showed analogous satisfactorily stable values, $I_{co}$ being from 2 $\mu$a. to 3 $\mu$a. for the p-n-p transistors and from 1 $\mu$a. to 2 $\mu$a. for the n-p-n transistors while the noise was from 4 db to 5 db in both types.

A comparison of the measurements of Table II and those of Table I reveals that, when the bouncing putty was preheated, the value $\alpha_{cb}$ after sealing-in, as compared to the value after final etching, was appreciably lower than when the bouncing putty was not preheated, but that by a stabilizing temperature treatment at a high temperature, which preferably exceeds 70° C., a high and stable $\alpha_{cb}$ was again obtained. This comparatively greater decrease in $\alpha_{cb}$ in the sealing-in process is generally observed with transistors in which a preheated boron oxide or preheated substance containing boron and oxygen is used, and in general this decrease is higher in proportion as the duration and/or the temperature of the preheating treatment is increased. However, this decrease is in general only temporary; a high stable value can again be obtained usually in a comparatively short period of time by means of a stabilizing temperature treatment. In general, the stability of the semi-conductor devices provided with a preheated boron oxide or preheated substance containing boron and oxygen is more satisfactory after such a stabilizing temperature treatment than that of semi-conductor devices provided with a not-preheated filler, however, it should be noted that an excessively prolonged preheating treatment may be detrimental. In addition, the semi-conductor devices which are provided with preheated boron oxide or a preheated substance containing boron and oxygen, in general are more capable of withstanding high temperatures of, for example, approximately 140° C. or higher.

EXAMPLE III

Three p-n-p germanium transistors were each mounted in the manner described in Example I in a glass envelope, reference 11 denoting boron oxide grains obtained for filling the bulb 9 by heating boric acid ($H_3BO_3$) at 250° C. for 2 hours. The atmosphere in the envelope was air. The following Table 3 shows the variation of the $\alpha_{cb}$ of these p-n-p transistors designated 31, 32 and 33, during the various treatments and the subsequent stabilizing temperature treatment and endurance test.

*Table III*

| | A | B | C, 140° C., 24h | D | | | | |
|---|---|---|---|---|---|---|---|---|
| | | | | 50 mw. | | | 55° C. | |
| | | | | 200h | 500h | 1,000h | 2,000h | 3,000h |
| 31 | 212 | 32 | 146 | 138 | 134 | 130 | 136 | 134 |
| 32 | 184 | 32 | 129 | 118 | 114 | 108 | 112 | 112 |
| 33 | 140 | 51 | 108 | 122 | 116 | 108 | 113 | 113 |

From Table III it will be seen that the semi-conductor devices stabilized with boron oxide only, also showed a high stability. The noise and the leakage current $I_{co}$ also had a corresponding high stability at satisfactory low values. The leakage current $I_{co}$ was from 2 $\mu$a. to 3 $\mu$a. and the noise from 4 db to 5 db. It was found that these transistors also were capable of withstanding high temperatures, for example 140° C.

EXAMPLE IV

Three p-n-p germanium transistors and three n-p-n germanium transistors were sealed in a glass envelope in the manner described in Example I, the greater part of the bulb 9 being previously filled with an intimate mixture of an organic filler and boron oxide in a ratio by weight of 19:1. The organic filler consists of a silico-organic polymer which under the trade name "Dow Corning High Vacuum Grease" is commercially available and which hereinafter will be designated, as is usual, silicone vacuum grease. The boron oxide was obtained by heating boric acid ($H_3BO_3$) to 140° C. for 10 days. The duration of this heat treatment is not critical. Subsequently the boron oxide was admixed with silicon vacuum grease of normal humidity and introduced into the bulb, after which the mixture was preheated to 100° C. for 24 hours. In the meantime the semi-conductor system of the transistor was dried at 100° C. for a few hours and inserted in hot condition into the mixture, after which the envelope was immediately sealed. The variation of the $\alpha_{cb}$ of these transistors during these treatments and the subsequent temperature treatments is shown in Table IV below. In this table, the p-n-p transistors are designated 41, 42 and 43 and the n-p-n transistors are designated 44, 45 and 46.

*Table IV*

| | A | B | C, 140° C., 100*h* | D, 100° C. | | | | | E, 20° C., 200*h* |
|---|---|---|---|---|---|---|---|---|---|
| | | | | 200*h* | 500*h* | 1,000*h* | 1,500*h* | 2,000*h* | |
| 41 | 208 | 48 | 142 | 152 | 147 | 145 | 142 | -------- | 150 |
| 42 | 182 | 51 | 129 | 144 | 140 | 136 | 132 | -------- | 140 |
| 43 | 221 | 43 | 146 | 156 | 154 | 150 | 146 | -------- | 154 |
| 44 | 71 | 17 | 72 | 74 | 76 | 76 | -------- | 76 | 73 |
| 45 | 95 | 18 | 86 | 87 | 86 | 88 | -------- | 88 | 86 |
| 46 | 95 | 20 | 88 | 93 | 89 | 86 | -------- | 86 | 83 |

As will be seen from Table IV these transistors are stable even at high temperatures, as is evident from the endurance test results D at 100° C. The preheating is not critical, since the humidity of the mixture also depends upon the humidity of the silicone vacuum grease, which in the case under consideration had been stored for a long time in an atmosphere of normal relative humidity of 60%; furthermore the mixture is heated subsequently. With such relative humidity storage, the mixture is preferably preheated, this is particularly the case if it is desired that the transistors concerned should be able to withstand high temperatures exceeding 100° C., for example 140° C. The duration of the preheating treatment is not critical but should be so chosen in accordance with the humidity of the initial mixture and the sensitivity of the semi-conductor device concerned. The temperature of preheating is preferably chosen between 70° C. and 150° C. Instead of using a preheating treatment, the initial material may be a filler and/or a boron oxide which is stored in a space of controlled humidity, or a preheating treatment may be applied to a mixture having such a more accurately defined humidity. In addition, the initial material may be a boron oxide or a substance containing a boron oxide having too low a humidity, this humidity being subsequently raised by providing the substance concerned in an atmosphere of higher humidity or by adding further material of higher humidity. In the case under consideration and in analogous cases in which the mixture is preheated, the humidity of the initial boron oxide before mixing is not very critical. Thus, similar satisfactory results were obtained when use was made of not-preheated boric acid ($H_3BO_3$) or of boric acid which had been melted in air at 1,000° C. for some hours and subsequently pulverised.

The leakage current $I_{co}$ and the noise also had an analogous satisfactory stability and satisfactory low values. The leakage current $I_{co}$ was from 1 $\mu$a. to 2 $\mu$a. for the p-n-p transistors and from 0.1 $\mu$a. to 0.5 $\mu$a. for the n-p-n transistors. The noise was approximately 4 db to 5 db for both types.

EXAMPLE V

Three p-n-p germanium transistors and three n-p-n germanium transistors, which had been inserted in a glass envelope in the manner described in Example IV and subsequently had been subjected to the same stabilizing temperature treatment, showed a similar satisfactory behaviour of the electrical properties in an endurance test comprising electric loading by 50 mw. in an ambient temperature of 55° C., as will be seen from the following Table V, in which the variation of the $\alpha_{cb}$ of these transistors is given. The p-n-p transistors are designated 51, 52 and 53 and the n-p-n transistors are designated 54, 55 and 56.

*Table V*

| | A | B | C, 140° C., 100*h* | D | | | | |
|---|---|---|---|---|---|---|---|---|
| | | | | 50 mw. | | 55° C. | | |
| | | | | 200*h* | 800*h* | 1,200*h* | 2,000*h* | 3,000*h* |
| 51 | 212 | 42 | 142 | 166 | 155 | 146 | 148 | 140 |
| 52 | 221 | 48 | 152 | 162 | 159 | 150 | 150 | 147 |
| 53 | 191 | 42 | 128 | 136 | 136 | 128 | 128 | 126 |
| 54 | 72 | 30 | 102 | 94 | 94 | 94 | 89 | -------- |
| 55 | 77 | 20 | 112 | 116 | 123 | 127 | 112 | -------- |
| 56 | 63 | 15 | 57 | 55 | 55 | 55 | 54 | -------- |

The leakage current $I_{co}$ and the noise had similar satisfactory low values as in Example IV.

Concerning the use of a mixture of an organic filler and boron oxide it is to be noted that after a prolonged temperature treatment at 140° C. at least part of the boron oxide in the envelope may be chemically combined with the organic filler. When the envelopes of such transistors, which had been stabilized at 140° C. for a prolonged period of time, were broken open, it was observed that the mixture of silicone vacuum grease and boron oxide showed mechanical properties similar to those of bouncing putty, that is to say it reacted elastically to high-speed stress and plastically to low-speed stress.

EXAMPLE VI

In order to ascertain what stabilization temperature is most effective with the use of a certain preheated mixture of boron oxide and silicone vacuum grease, and to ascertain the variation of the $\alpha_{cb}$ and $I_{co}$ during the various temperature treatments, three p-n-p and three n-p-n germanium transistors were sealed in a glass envelope in the manner described in Example I, the bulb being filled for the greater part with an intimate mixture of silicone vacuum grease and boron oxide having a content of boron oxide of 5% by weight. The mixture of silicone vacuum grease and boron oxide was prepared and the transistor was sealed in the envelope in the following manner:

Lumps of $B_2O_3$ obtained by melting boric acid ($H_3BO_3$) in air at 1,000° C. for 1 hour, were pulverised in air, the hygroscopic $B_2O_3$ absorbing a small amount of water during the pulverizing. The powder was mixed in air with silicone vacuum grease of normal humidity. The bulb was partly filled with this mixture and subsequently heated in air to 100° C. for 24 hours. In the meantime the transistors were dried in air at 100° C. for some time and thrust into the mixture while hot, whereupon the bulb was sealed in air.

The variation of the $\alpha_{cb}$ and $I_{co}$ during the various treatments is indicated in Table VI below, in which the p-n-p transistors are designated 61, 62 and 63 and the n-p-n transistors are designated 64, 65 and 66. The $I_{co}$ is indicated in $\mu$a.

*Table VI*

| | | A | B | C | D | E |
|---|---|---|---|---|---|---|
| | | | | 100° C., 3*d* | 140° C., 3*d* | 20° C., 200*h* |
| 61 | $\alpha_b$ | 206 | 43 | 34 | 104 | 101 |
| | $I_{co}$ | 15 | 14 | 1.5 | 1.2 | 1.2 |
| 62 | $\alpha_b$ | 160 | 42 | 31 | 93 | 94 |
| | $I_{co}$ | 16 | 14 | 1.4 | 1.0 | 1.0 |
| 63 | $\alpha_{bc}$ | 166 | 41 | 32 | 102 | 99 |
| | $I_{co}$ | 12 | 9 | 2 | 1.2 | 1.2 |
| 64 | $\alpha_{bc}$ | 112 | 37 | 50 | 152 | 149 |
| | $I_{co}$ | 0.3 | 2.2 | 2.0 | 0.2 | 0.2 |
| 65 | $\alpha_{cb}$ | 100 | 32 | 38 | 123 | 129 |
| | $I_{co}$ | 0.4 | 2.5 | 1.1 | 0.2 | 0.2 |
| 64 | $\alpha_{co}$ | 27 | 20 | 22 | 72 | 70 |
| | $I_{cb}$ | 2.9 | 2.9 | 2.8 | 0.4 | 0.4 |

It was found that the values of $\alpha_{cb}$ and $I_{co}$ given in Table VI under E remained substantially constant in further endurance tests. The noise level of these transistors was also low and stable, namely approximately 4 db to 5 db. It will also be seen from Table VI that for the p-n-p transistors after the temperature treatments at 100° C. for 3 days, the collector current $I_{co}$ already showed satisfactorily low, substantially-stable values, but that the optimum stable values of $\alpha_{bc}$ were reached only after the temperature treatment at 140° C., in which treatment the $I_{co}$ was also slightly improved. In the n-p-n transistors, some improvement both in the $\alpha_{bc}$ and in the $I_{co}$ was shown after the temperature treatment at 100° C. as compared with the values after sealing in. In the n-p-n transistors also, the optimum values of $\alpha_{bc}$ and of $I_{co}$ were reached only after the temperature treatment at 140° C. From similar tests the more general rule can be deduced that, in order to obtain the optimum values of the electrical quantities with a transistor provided with a preheated filler, the stabilizing temperature treatment is preferably chosen more intensive, that is to say of greater duration and/or at a higher temperature, as the humidity of the filler is lower, that is to say, as the preheating treatment is more intensive. An excessively intensive preheating treatment however serves no useful purpose and similarly excessively intensive stabilizing temperature treatment is undesirable, since at a higher temperature the likelihood of failure of the transistor itself is, in general, increased. In general, the transistors provided with a preheated filler are more stable and more capable of withstanding elevated temperatures than the transistors not provided with a preheated filler. Which stabilizing method is used when applying the invention, depends inter alia upon the stability requirements which the semi-conductor device is required to satisfy.

In the following examples which relate to p-n-p silicon transistors, the semi-conductor device is an alloy transistor manufactured by alloying to a semi-conductor disc of n-type silicon of thickness approximately 130 microns an emitter pellet and a collector pellet, which both consist of aluminum, and a base contact consisting of a gold-antimony alloy (99% by weight of Au and 1% by weight of Sb) by heating in an atmosphere of hydrogen at a temperature of approximately 800° C. for about 5 minutes. The p-n-p transistors have been etched electrolytically in an etching bath consisting of an aqueous 40% HF solution and ethyl alcohol in a volume ratio of 4 to 1, with the emitter and the collector being connected to the positive terminal and using a platinum electrode as the cathode, followed by washing with water.

Again with the following examples, the quantities $\alpha_{cb}$ and $I_{co}$ were measured with the device at room temperature (20° C.) and the conditions of measurement were as described above with reference to the germanium transistors.

EXAMPLE VII

Three p-n-p silicon transistors were each mounted in the manner shown in FIGURE 1. Reference 11 relates to bouncing putty which was introduced into the bulb 9 without pretreatment from a container after storage in an ambient atmosphere having a relative humidity of about 60% and subsequently the semi-conductor system of the transistors was carefully thrust into the bouncing putty, after which the envelope was sealed.

The transistors were subjected to a temperature treatment and an electric load test. The variation of current amplification factor $\alpha_{cb}$ is given below in Table VII.

*Table VII*

| | A | B | C., 150° C., 2h | D | | | |
|---|---|---|---|---|---|---|---|
| | | | | 150 mw. | | 75° C. | |
| | | | | 7d | 14d | 21d | 42d |
| 71 | 36 | 35 | 49 | 49 | 49 | 50 | 48 |
| 72 | 23 | 22 | 26 | 25 | 25 | 25 | 25 |
| 73 | 34 | 33 | 38 | 38 | 38 | 38 | 37 |

As will be seen from Table VII the transistors reached a substantially stable value of $\alpha_{cb}$ after stabilizing heat treatment. The leakage current $I_{co}$ was measured at the end of the stabilizing heat treatment and after each stage of the load test. At the end of the stabilizing heat treatment for transistor 71 the $I_{co}$ value was 80 milli-microamps and in each other case was below 20 milli-microamps.

EXAMPLE VIII

Six p-n-p silicon transistors were sealed in a glass envelope in bouncing putty exactly as described in Example VII and three of them then subjected to a short storage period at the temperature specified, $\alpha_{cb}$ being measured.

*Table VIII(1)*

| | A | B | C., 2h, 150° C. | E., 19h, 150° C. |
|---|---|---|---|---|
| 81 | 50 | 47 | 55 | 51 |
| 82 | 19 | 18 | 22 | 21 |
| 83 | 34 | 33 | 47 | 39 |

Table VIII(1) shows that a stabilizing heat treatment in excess of 2 hours at 150° C. may be, in general, desirable and it was found that after a total of about 4 hours at 150° C., the stability at 150° C. was very good and the $\alpha_{cb}$ stabilized substantially at the figures given in column E. If stabilization at a lower ambient temperature than 150° C. is desired the 2 hours, however, is in general sufficient.

The $I_{co}$ values were measured after the 2 hour heat treatment and after the 15 hour heat treatment and in each case found to be below 20 milli-microamps.

The other three transistors, after stabilizing heat treatment were subjected to a temperature-cycle test of 5 cycles as follows:

20 minutes at 150° C.,
10 minutes at 20° C.,
20 minutes at −55° C., and
10 minutes at 20° C.

The $\alpha_{cb}$ values after the stabilizing heat treatment and after the subsequent temperature cycle test were as follows:

TABLE VIII(2)

| | C., 150° C., 2h | E, after five thermal cycles |
|---|---|---|
| 84 | 43 | 45 |
| 85 | 42 | 45 |
| 86 | 42 | 45 |

In each case the $I_{co}$ value was below 20 milli-microamps.

Finally it should be noted that the invention is not restricted to transistors but that it can be applied to other semi-conductor devices the semi-conductor body of which contains active parts, for example, to crystal diodes.

The invention is not restricted to the use of the semi-conductors germanium and silicon. It can also be applied to other semi-conductors or semi-conductive compounds such as the $A_{III}B_V$ compounds, for example GaAs, InP to provide the similar advantage of stabilisation of the atmosphere within the seal.

What is claimed is:

1. A semi-conductor device comprising a semi-conductive body having an active surface portion, means hermetically sealing off and enclosing said active surface portion, and boron oxide within said means for improving the electrical stability of the device.

2. A device as set forth in claim 1 wherein the hermetically sealing off means includes a glass wall.

3. A semi-conductor device comprising a hermetically sealed envelope, a semi-conductive body and contacts enclosed within said envelope, and boron oxide present within said envelope in a reactive form and improving the electrical stability of the device.

4. A device as set forth in claim 3 wherein the boron oxide contains absorbed water.

5. A semi-conductor device comprising a hermetically sealed envelope, a semi-conductive body and contacts enclosed within said envelope, a filler material within said envelope, and boron oxide within said envelope for improving the electrical stability of the device.

6. A device as set forth in claim 5 wherein the filler material is selected from the group consisting of silica, sand and lithopone.

7. A device as set forth in claim 5 wherein the filler is a silico-organic compound.

8. A device as set forth in claim 7 wherein the compound is a linear dimethyl silicone oil.

9. A semi-conductor device comprising a hermetically sealed envelope, a semi-conductive body and contacts enclosed within said envelope, and a substance containing boron oxide within said envelope and improving the electrcal stability of the device.

10. A device as set forth in claim 9 wherein the substance comprises a filler material intimately mixed with boron oxide.

11. A device as set forth in claim 10 wherein the boron oxide constitutes between 1% and 10% by weight of the filler.

12. A device as set forth in claim 10 wherein the boron oxide constitutes between 4% and 6% by weight of the filler.

13. A device as set forth in claim 9 wherein the substance comprises an organic compound containing boron and oxygen.

14. A device as set forth in claim 13 wherein the compound is a silico-organic polymer.

15. A device as set forth in claim 14 wherein the compound is a boric acid derivative of silicone oil.

16. A device as set forth in claim 14 wherein the compound is a boron and oxygen containing bouncing putty.

17. A semi-conductor transistor device comprising a hermetically sealed envelope, a transistor comprising a semi-conductive body and contacts enclosed within said envelope, and boron oxide containing absorbed water within said envelope and improving the electrical stability of the device.

18. A device as set forth in claim 17 wherein the body is selected from the group consisting of genmanium and silicon.

19. A semiconductor device comprising a hermetically sealed envelope, a transistor comprising a semiconductive body and contacts enclosed within said envelope, and boron oxide in a form controlling the moisture content within the envelope and improving the electrical stability of the device.

20. A semiconductor device comprising a hermetically sealed envelope, a transistor comprising a semiconductive body and contacts enclosed within said envelope, and a boron oxide-boric acid substance within said envelope and improving the electrical stability of the device.

21. A device as set forth in claim 13, wherein the substance includes absorbed water.

References Cited in the file of this patent

UNITED STATES PATENTS

| | | |
|---|---|---|
| 2,798,189 | Alexander | July 2, 1957 |
| 2,813,326 | Liebowitz | Nov. 19, 1957 |
| 2,836,878 | Shepard | June 3, 1958 |
| 2,844,769 | Erkelens et al. | July 22, 1958 |
| 2,877,392 | Koets et al. | Mar. 10, 1959 |

UNITED STATES PATENT OFFICE

CERTIFICATE OF CORRECTION

Patent No. 2,998,556 August 29, 1961

John Pritchard et al.

It is hereby certified that error appears in the above numbered patent requiring correction and that the said Letters Patent should read as corrected below.

Column 2, line 10, for "constant" read -- content --; lines 29 and 30, strike out "since it has been found that an optimum water content applies,"; column 5, line 17, for "though" read -- through --; column 7, Table I, column 6, line 1 thereof, for "125" read -- 124 --; column 10, Table VI, column 1, line 6 thereof, for "64" read -- 66 --; same table, column 7, line 11 thereof, for "70" read -- 73 --; column 14, line 17, for "genmanium" read -- germanium --.

Signed and sealed this 20th day of March 1962.

(SEAL)
Attest:

ERNEST W. SWIDER
Attesting Officer

DAVID L. LADD
Commissioner of Patents